Patented May 21, 1929.

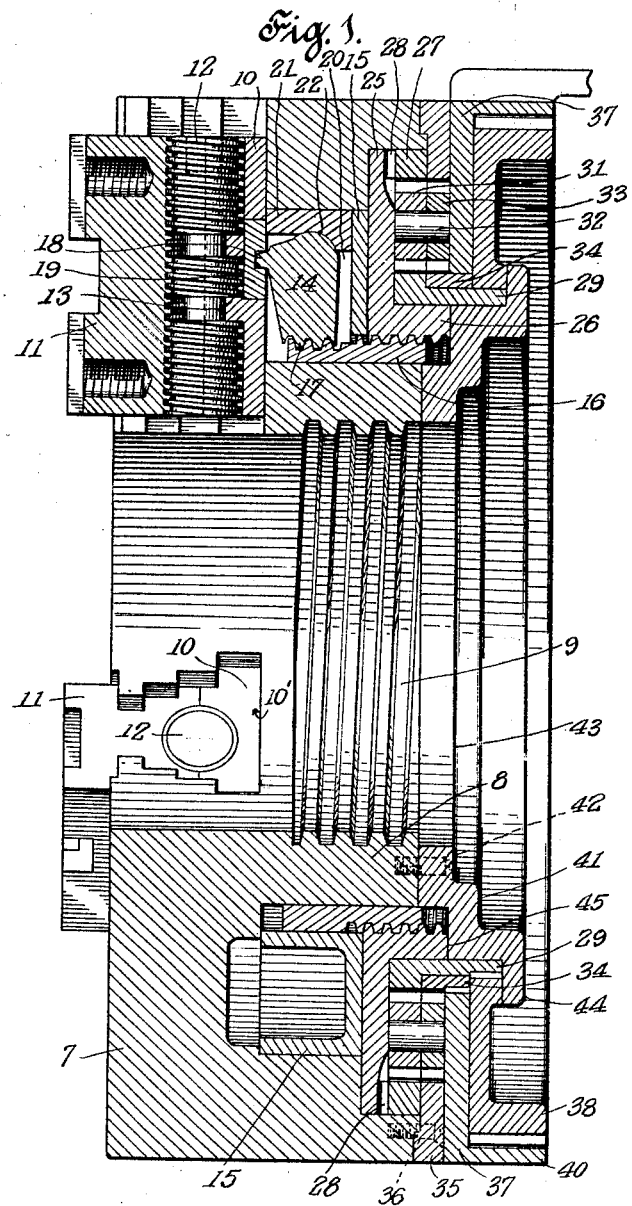

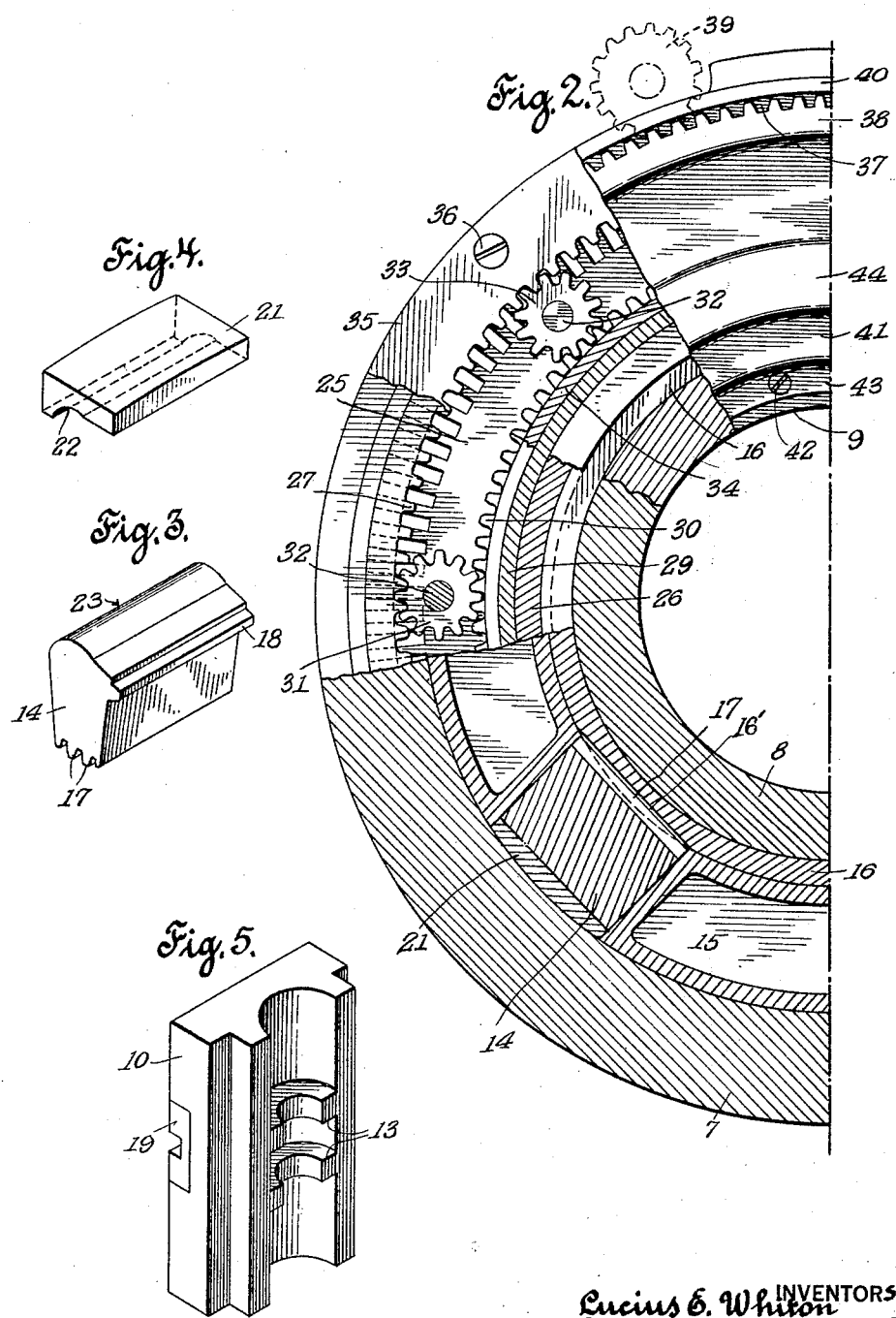

1,713,798

UNITED STATES PATENT OFFICE.

LUCIUS E. WHITON, OF NEW LONDON, CONNECTICUT, AND GEORGE A. MIDWOOD, JR., OF WEST BARRINGTON, RHODE ISLAND, ASSIGNORS TO THE D. E. WHITON MACHINE COMPANY, OF NEW LONDON, CONNECTICUT, A CORPORATION OF CONNECTICUT.

LATHE CHUCK.

Application filed February 13, 1926, Serial No. 88,017. Renewed August 10, 1928.

One object of our invention is to provide a compact construction with positive, powerful and durable means for adjusting the jaws.

Another object is to provide a construction of this character in which the jaws may be automatically adjusted for gripping and releasing the stock, regardless of whether the chuck is stationary or rotating.

Another object is to provide a compact and self-contained mechanism of this character in which the center of the chuck is left entirely unobstructed so that the stock to be treated may be fed through the spindle.

Another object is to provide a construction of the foregoing character which can be readily manufactured and assembled or disassembled when necessary.

Fig. 1 is a longitudinal sectional view of one form of mechanism embodying our invention.

Fig. 2 is a rear elevation and transverse sectional view of one-half of the chuck showing details of the mechanism.

Fig. 3 is a perspective view of one of the tilting members for moving the jaws.

Fig. 4 is a perspective view of a bearing plate for one of the tilting members.

Fig. 5 is a perspective view of part of one of the jaws.

The body 7 of the chuck has a hub 8 and may be provided with a screw thread 9 for attaching it to an ordinary lathe spindle. Radial guide ways 10' are provided in the usual manner for the jaws. These jaws may be of any suitable type. In the form shown, each jaw is made up of the two parts 10 and 11 with an intervening screw 12 which is guided between shoulders 13 in the base 10 and which has a threaded engagement with the outer part 11 so that by rotation of the screw the outer part may be radially adjusted with respect to the base 10. Any suitable form of gripping members may be attached to the part 11 in the customary manner. These jaws are moved radially by a series of tilting members or gear segments 14 carried by ring 15 within the chuck body. These tilting members are adapted to be operated by a sleeve 16 which slides on the hub 8 of the chuck body. This sleeve has a series of gear teeth 16' engaging the gear teeth 17 on the tilting members and each tilting member has one or more fingers or teeth 18 which engage in grooves in the bearing pieces 19 in the backs of the jaw bases 10. The ring 15 is provided with recesses or pockets 20 to receive the tilting members 14 and the bearing plates 21. These bearing plates 21 and tilting members 14 are provided with co-acting hardened bearing surfaces 22 and 23 of such a character that no pins or studs of the character ordinarily employed are required.

In back of the ring 15 is mounted a rotatable plate 25 which has a flange or hub 26 with an interior screw thread co-acting with a screw thread on the rear end of the sleeve 16. An annular gear 27 having internal teeth is rotatably mounted in the rear end of the body 7 of the chuck and has clutch teeth 28 which engage in corresponding clutch teeth in the rear face of the plate or disc 25 so that the gear ring and plate rotate together as if they were one part, although the gear ring is separately made for convenience in manufacture. The gear member 29 is mounted on the hub or flange 26 and provided with external teeth arranged opposite the gear teeth in the ring 27. Between the gears 27 and 29 are mounted a series of pinions 31 adapted to have planetary motion. Each one of these pinions has a shaft 32 on the outer end of which is mounted another pinion 33 so that the pinions of each pair are independently rotatable but they are compelled always to travel together. A gear member 34 having external teeth is mounted on the hub of the gear member 29 and meshes with the pinions 33. An annular gear 35 having internal teeth also meshes with the pinions 33. This gear 35 is secured to the body of the chuck in a suitable manner, as, for instance, by a series of screws 36 so that although the parts are separately formed they rotate together. The gear 34 is keyed to a plate 37 which is provided with any suitable means for securing it to a stationary support. The gear 29 is adapted to be rotated with respect to the relatively stationary gear 34. For this purpose we prefer to provide a rotatable variator 38 which may be provided with external teeth and adapted to be driven by a pinion 39 which in turn may be driven by hand or by power. The plate 37 may have a flange 40 extending around the gear 38 for guarding its teeth.

A back plate 41 is provided for holding the parts together. This back plate may be secured to the body of the chuck by a series of screws 42 and in fact constitutes a part of the body of the chuck. This back plate may have a shoulder 43 adapted to abut against the outer end of the ordinary spindle (not shown). This back plate also has a flange 44 which serves as an abutment for the hub of the gear 38 and it has a shoulder 45 which serves as an abutment for the hub or flange 26 of the rotating disc 25.

During the ordinary operation or use of the chuck, the gear member 38, as well as the fixed member 37, is stationary so that both of the gears 29 and 34 are stationary. The body of the chuck with the jaws and the ring 15, plate 25, and gears 27 and 35 are, therefore, free to rotate so that the pairs of pinions 31 and 33 travel around freely in the space between the gears 27 and 35 and the gears 29 and 34, respectively. When it is desired to move the jaws in or out, it is simply necessary to rotate the variator 38. The gear 34 being stationary, with respect to the variator 38, compels the pinions 31 and 33 to have a planetary motion so that while the gear 35 and the chuck body are rotating at one speed, the gear 27 is moved relatively to gear 35 by the action of the variator 38, gear 29, and pinions 33. The rotation of gear 27 carries with it the plate 25 whose hub 26 has threaded engagement with the sleeve 16. This causes the sleeve 16 to travel longitudinally on the hub 8 of the chuck body thus tilting the gear segments 14 and moving the chuck jaws in or out, as the case may be, an amount determined by the relative rotation of the variator 38. Rotation of ring 15 relative to body 7 and sleeve 16 may be prevented by the engagement of the ends of the tooth 18 in the guide slot 10' and by the meshing of the teeth 17 with teeth 16' respectively.

To separate the parts the screws 42 are removed so that the back plate 41 can be retracted from the rear. The variator 38 may then be removed rearwardly from the hub of the gear member 29. The remainder of the chuck body and contained parts may then be removed forwardly from the fixed plate 37. When the screws 36 are removed, the annular gears 35 and 27 may be removed. The gears 29 and 34 and the pinions 31 and 33 may be removed either before or after the gear 35 is removed. After the gear members 27 and 29 have been removed, the disc or plate 25 may be unscrewed from the sleeve 16, whereupon the sleeve 16 and the ring 15 and tilting members 14 and their bearing plates 21 may be removed from the rear of the chuck body. The parts may, of course, be assembled in the reverse order.

A construction of this character is particularly desirable where it is necessary to make the chuck of a comparatively small diameter and mounted upon a comparatively large spindle. In such constructions there is inadequate room for scroll plates having sufficient threads to afford the durability required. Although we have shown this construction as applied to a chuck adapted for automatic adjustment, it should be understood that certain details of the construction are applicable to other chucks whether provided with the automatic feature or not. We do not, therefore, wish the claims to be construed as limited to the particular construction shown unless required by their terms or the prior art to be so limited.

We claim:

1. A chuck body having radially movable jaws, a unitary sleeve slidable axially in said body and having rack teeth on one end and a screw thread on the other end, a rotatable member having a screw thread engaging the thread on said sleeve and tilting members interposed between said rack teeth and said jaws.

2. A chuck body having radially movable jaws, a unitary sleeve slidable axially in said body and having rack teeth on one end and a screw thread on the other end, a rotatable member having a screw thread engaging the thread on said sleeve, tilting members interposed between said rack teeth and said jaws and a back plate secured to said body and serving as an abutment for said rotatable member.

3. A chuck body having jaws and a hub, a ring of channel cross section mounted in said body and having recesses alined with said jaws, a tilting member pivoted in each recess, a sleeve mounted on said hub inside of said ring and having teeth engaging said tilting members and a rotatable plate having a threaded driving connection with said sleeve.

4. A chuck body having a recess, a ring mounted in said recess and having pockets, a bearing plate in the outer end of each pocket, a tilting member fitting each pocket and resting in a bearing plate, a jaw operable by each tilting member and means for operating each tilting member, comprising a sliding sleeve and an actuating rotor therefor.

5. A chuck body having jaws, a sleeve slidable in said body and geared to said jaws, a flanged plate having a screw thread connection with said sleeve, a gear rotatably mounted on said flange, an annular gear connected to the outer edge of said plate, pinions mounted to travel between said gears, a stationary gear alongside of said first mentioned gear, an annular gear connected to and carried by said chuck body, pinions mounted to rotate independently of said first mentioned pinions but to travel around with them between said stationary gear and the body-carried gear.

6. A chuck body having jaws, a sleeve slidable in said body and geared to said jaws, a flanged plate having a screw thread connection with said sleeve, a gear rotatably mounted on said flange, an annular gear connected to the outer edge of said plate, pinions mounted to travel between said gears, a stationary gear alongside of said first mentioned gear, an annular gear connected to and carried by said chuck body, pinions mounted to rotate independently of said first mentioned pinions but to travel around with them between said stationary gear and the body-carried gear and a back plate secured to said body and forming an abutment for said flanged plate.

7. An automatic chuck comprising a body, a plate mounted to rotate therein, jaws mounted to slide in said body, a sliding sleeve having a threaded connection with said plate, gear segments between said sleeve and jaws, an annular gear connected to said plate, a gear rotatable in said body, a series of pinions interposed between said gears, an annular gear connected to said body, a stationary gear, a plate supporting said latter gear, a series of pinions interposed between said two last-mentioned gears, a series of shafts connecting the pinions of the two series and guided between said stationary plate and said first plate, and means for rotating said second mentioned gear.

8. A chuck comprising a body with movable jaws, a sleeve slidable in said body, gear segments connecting the sleeve and jaws, a plate rotatable on said sleeve for moving said sleeve, a stationary plate and a cooperating gear train having parts connected to said plates and other parts guided on and between said plates.

9. A chuck body having radially movable jaws, a unitary sleeve slidable axially in said body and having rack teeth on one end and a screw thread on the other end, a rotatable member having a screw thread engaging the thread on said sleeve and tilting members interposed between said rack teeth and said jaws, said chuck body having an internal hub with an unobstructed central passage for the feed of stock, said sleeve being mounted on said hub.

10. A chuck body having a hub and movable jaws, a ring mounted in the body and having recesses with open bearings facing forwardly and inwardly, tilting members in said recesses and resting in said bearings and connected to said jaws and a sleeve slidable on said hub and geared to said tilting members and a rotatable plate having a screw threaded connection with said sleeve for sliding the same on said hub.

11. A chuck such as set forth in claim 1 in which the tilting members are removable independently of their bearings.

12. A chuck comprising a body having radial guide-ways, jaws movable in said guide-ways, a bearing block removably supported in said body adjacent each jaw and having a bearing socket open toward the axis of the body, a tilting member having a bearing surface at its outer end supported in each bearing socket and having a tooth cooperatively engaging the adjacent jaw, a sleeve slidably supported and geared to the inner ends of said tilting members, and means for moving said sleeve in said body to adjust said jaws.

13. A chuck comprising a body having radial guide-ways, jaws movable in said guide-ways, a bearing block removably supported in said body adjacent each jaw and having a bearing socket open toward the axis of the body, a tilting member having a bearing surface at its outer end supported in each bearing socket and having a tooth cooperatively engaging the adjacent jaw, a sleeve slidably supported and geared to the inner ends of said tilting members said sleeve having a helical thread, a member having a threaded engagement with said sleeve, annular gears connected to the chuck body and to said member, two spur gears arranged alongside of each other inside of said annular gears, pairs of planetary pinions traveling between the spur and annular gears and means for moving one spur gear with respect to the other for adjusting said jaws.

14. A chuck comprising a body having guide-ways, jaws movable in said guide-ways, a tilting member supported in said body adjacent each of said jaws and having a tooth cooperatively engaging the adjacent jaw, a sleeve slidably supported in the chuck, said sleeve having a helical thread, a member having a threaded engagement with said sleeve, annular gears connected to the chuck body and to said member, two spur gears arranged alongside of each other inside of said annular gears, pairs of planetary pinions traveling between the spur and annular gears and means for moving one spur gear with respect to the other for adjusting said jaws.

LUCIUS E. WHITON.
GEORGE A. MIDWOOD, Jr.